US006927475B2

(12) United States Patent  
Lu

(10) Patent No.: US 6,927,475 B2  
(45) Date of Patent: Aug. 9, 2005

(54) POWER GENERATOR AND METHOD FOR FORMING SAME

(75) Inventor: Nai-Chen Lu, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 10/717,362

(22) Filed: Nov. 19, 2003

(65) Prior Publication Data

US 2005/0104159 A1    May 19, 2005

(51) Int. Cl.[7] .......................................... H01L 29/00
(52) U.S. Cl. ................. 257/532; 257/414; 257/416; 257/421; 257/426; 310/10; 310/12; 310/15; 310/26
(58) Field of Search ................ 257/414, 416, 257/421, 426, 532; 310/10, 26, 12, 15

(56) References Cited

U.S. PATENT DOCUMENTS 5,818,132 A * 10/1998 Konotchick ................. 310/17

| 6,509,894 B1 | 1/2003 | Maekawa et al. ........... 345/211 |
| 6,515,375 B1 | 2/2003 | Beal ............................. 290/42 |
| 2002/0043895 A1 * | 4/2002 | Richards et al. ............ 310/328 |
| 2003/0003618 A1 * | 1/2003 | Fujii et al. .................... 438/45 |
| 2003/0137220 A1 * | 7/2003 | Pinkerton .................... 310/339 |
| 2004/0104623 A1 * | 6/2004 | Nakano et al. ............... 310/12 |

* cited by examiner

Primary Examiner—Tom Thomas  
Assistant Examiner—Matthew E. Warren  
(74) Attorney, Agent, or Firm—Thomas, Kayden, Horstemeyer & Risley

(57) ABSTRACT

A power generator. The power generator includes a first substrate, a second substrate, a magnetic film, a first metal layer, a second metal layer and an electricity storage device. The second substrate is disposed on the first substrate. A vibration chamber is formed between the first substrate and second substrate. The magnetic film is disposed between the first substrate and second substrate and located in the vibration chamber. The magnetic film has a predetermined magnetic field. The first metal layer is disposed under the first substrate and is aligned with the vibration chamber. The second metal layer is disposed on the second substrate and is aligned with the vibration chamber. The electricity storage device is electrically connected to the first metal layer and second metal layer.

14 Claims, 9 Drawing Sheets

POWER GENERATOR AND METHOD FOR FORMING SAME

BACKGROUND OF THE INVENTION

1. Field of the Invention

The present invention relates to a power generator, and in particular to a power generator that converts vibration energy into electric power.

2. Description of the Related Art

Generally speaking, there are many types of conventional power generators. Some use mechanical or physical means to generate power, and the others employ electronic or electric circuit design to accomplish power generation.

For example, a self-winding watch works continuously by converting vibrations to power. Thus, the self-winding watch is representative of a device that acquires power from vibration.

U.S. Pat. No. 6,515,375 discloses an electrical power generator. The electrical power generator has an alternator floating freely on a water surface. The alternator has a magnet and a wire coil structure. When wave motion occurs on the water surface, the magnet and wire coil structure undergo relative movement therebetween in response to the wave motion, thereby causing induced current to flow through the wire coil structure. The induced current can then be output to be used or stored.

U.S. Pat. No. 6,509,894 discloses a power generation method employed in an LCD. The power generation method uses a power generating circuit, rather than mechanical or physical means, to generate electric power.

Although the aforementioned electrical power generator of U.S. Pat. No. 6,515,375 employs physical means to generate electric power, the structure thereof is complex. In addition, use of the electrical power generator is inconvenient as it requires water or liquid to generate electric power.

Hence, there is a need to provide a power generator that can readily generate power by converting an environmental vibration into electricity or electric power.

SUMMARY OF THE INVENTION

Accordingly, a first object of the invention is to provide a power generator. The power generator of one embodiment comprises a first substrate, a second substrate, a magnetic film, a first metal layer, a second metal layer, and an electricity storage device. The second substrate is disposed on the first substrate. A vibration chamber is formed between the first substrate and second substrate. The magnetic film is disposed between the first substrate and second substrate and is located in the vibration chamber. The magnetic film has a predetermined magnetic field. The first metal layer is disposed under the first substrate and is substantially aligned with the vibration chamber. The second metal layer is disposed on the second substrate and is substantially aligned with the vibration chamber. The electricity storage device is electrically coupled to the first and second metal layers.

In one embodiment, the power generator is embedded in a semiconductor chip for obtaining electric power by converting vibration energy into electric energy.

In one embodiment, the power generator further comprises a first circuit and a second circuit. The electricity storage device is connected to the first metal layer through the first circuit and connected to the second metal layer through the second circuit.

In one embodiment, the power generator further comprises a first insulation control switch and a second insulation control switch. The first insulation control switch is disposed on the first circuit, and the second insulation control switch is disposed on the second circuit.

In one embodiment, the first insulation control switch and second insulation control switch are implemented as N-type transistors (NMOS).

In one embodiment, the first substrate and second substrate are composed of insulation elements.

In one embodiment, the first metal layer further comprises a first coil circuit, and the second metal layer further comprises a second coil circuit.

In one embodiment, the first coil circuit and second coil circuit are respectively formed on the first metal layer and second metal layer by photolithography and etching or printing.

In one embodiment, the vibration chamber constitutes a vacuum and provides pressure of approximately $10^{-6}$ torr.

In one embodiment, the electricity storage device is a capacitor or battery.

In one embodiment, the first and second substrates are SiN.

A second object of the invention is to provide a method for forming a power generator. The method of one embodiment comprises the steps of: providing a first insulation substrate; forming a first metal layer on a lower surface of the first insulation substrate; forming a second insulation substrate on the first insulation substrate; defining a vibration chamber between the first insulation substrate and second insulation substrate; dividing the vibration chamber by forming a magnetic film between the first insulation substrate and second insulation substrate; and forming a second metal layer on the second insulation substrate.

A third object of the invention is to provide a method for forming the power generator. The method of one embodiment comprises the steps of: providing a first insulation element; forming a first metal layer on the lower surface of the first insulation element; creating a recess aligned with the first metal layer on the first insulation element; filling the recess with a second insulation element; constructing a magnetic film on the recess of the first insulation element; forming a third insulation element on the magnetic film, wherein the third insulation element aligns with the second insulation element; forming a fourth insulation element on the first insulation element and magnetic film, wherein the fourth insulation element receives the third insulation element; forming a fifth insulation element on the third and fourth insulation elements; forming at least one first through-groove on the fifth insulation element, wherein the first through-groove is located on the third insulation element; forming a sixth insulation element on the fifth insulation element and in the first through-groove; forming a plurality of second through-grooves on the sixth insulation element, wherein the plurality of second through-grooves are located on the fifth insulation element; forming a seventh insulation element on the sixth insulation element and in the second through-grooves; removing the second, third, and sixth insulation elements to form a vibration chamber, wherein the magnetic film is in the vibration chamber; evacuating (at least partially) the vibration chamber to create a vacuum; sputtering a second metal layer on the fifth and seventh insulation elements; forming a first coil circuit and a second coil circuit on the first metal layer and second metal layer, respectively; and connecting the first and second coil circuits to an electricity storage device.

In one embodiment, the first, fourth, fifth and seventh insulation elements are SiN.

In one embodiment, the second, third and sixth insulation elements are same.

In one embodiment, the second, third and sixth insulation elements are fluorinated silicate glass (FSG) or spin on glass (SOG).

In one embodiment, the first through-groove is formed by etching.

In one embodiment, the second through-grooves are formed by etching.

In one embodiment, the second, third and sixth insulation elements are removed by wet etching.

In one embodiment, the wet etching uses HF solution to remove the second, third and sixth insulation elements.

In one embodiment, the vacuum provides pressure of approximately $10^{-6}$ torr.

In one embodiment, the first coil circuit and second coil circuit are respectively formed on the first metal layer and second metal layer by photolithography and etching or printing.

In one embodiment, the electricity storage device is a capacitor or battery.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 8A:
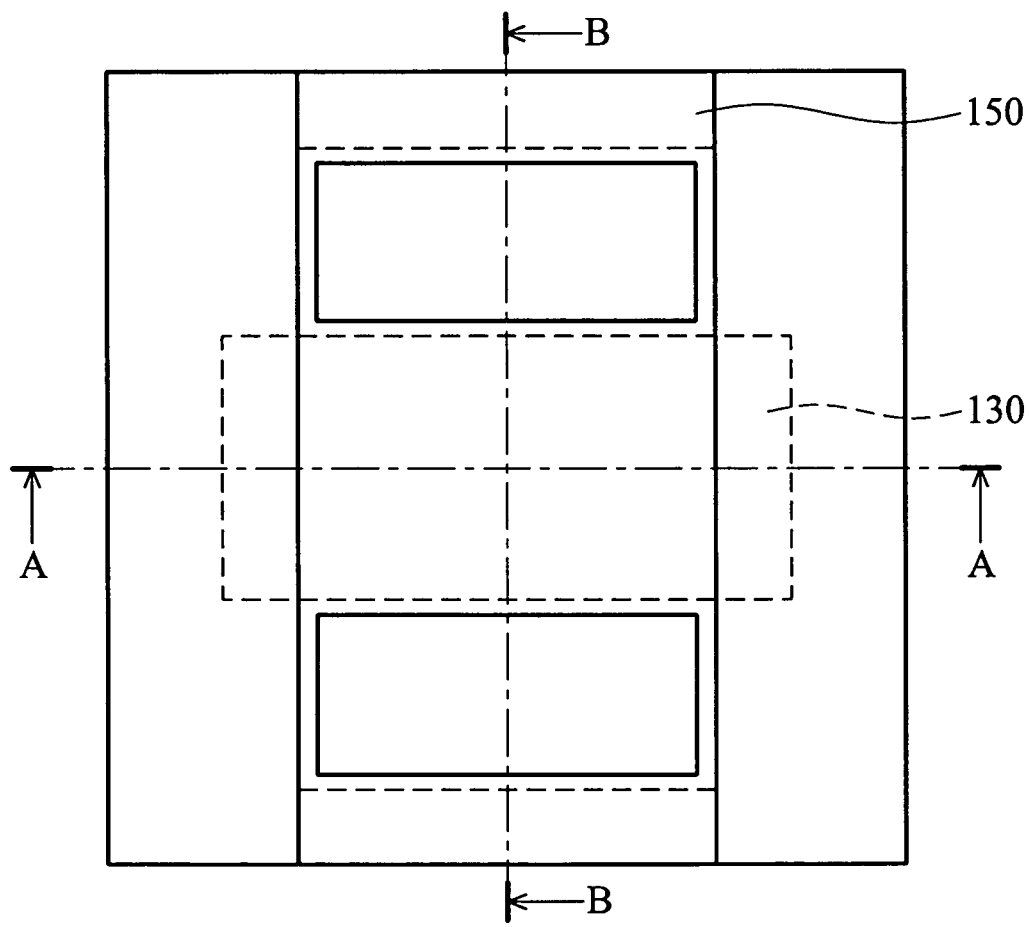
FIG. 8A is a schematic view showing the formation of the power generator of an embodiment of the invention.
Figure 8B:
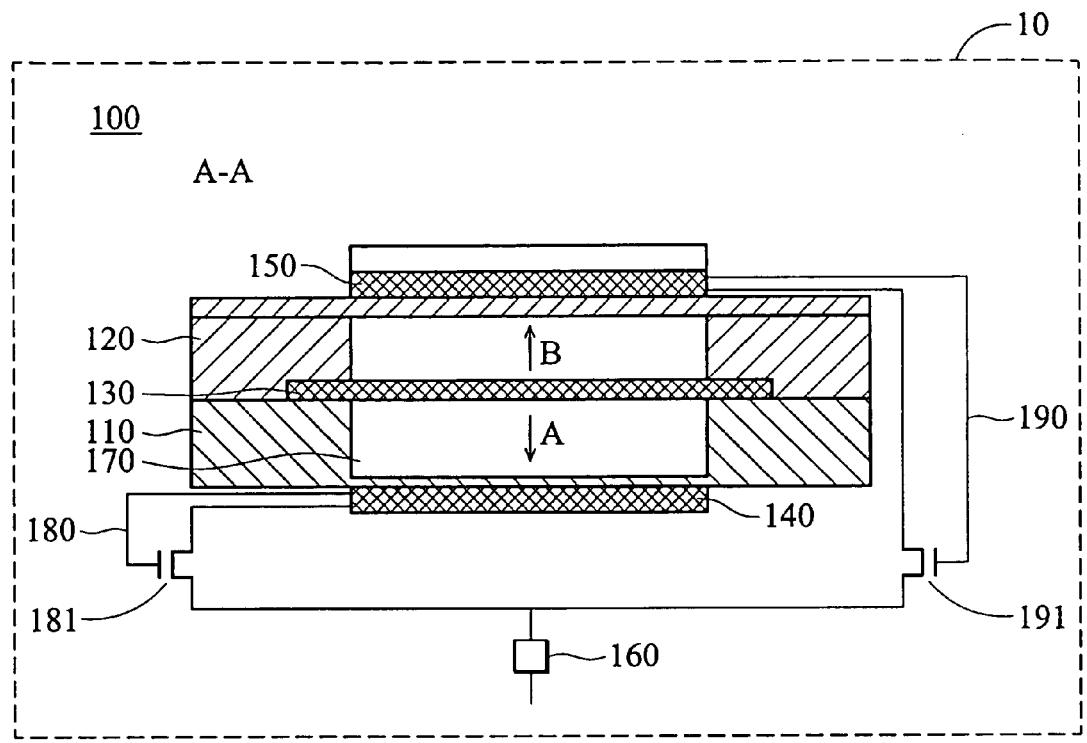
FIG. 8B is a schematic cross section taken along line A—A of FIG. 8A.

Referring first to FIG. 8B, a power generator 100 is embedded in a semiconductor chip 10 for obtaining electric power by converting vibration energy into electric energy. The power generator 100 comprises a first substrate 110, a second substrate 120, a magnetic film 130, a first metal layer 140, a second metal layer 150 and an electricity storage device 160. The second substrate 120 is disposed on the first substrate 110. A vibration chamber 170 is defined between the first substrate 110 and second substrate 120. The first substrate 110 and second substrate 120 are composed of insulating material. A magnetic film 130 is disposed between the first substrate 110 and second substrate 120 and divides the vibration chamber 170. The magnetic film 130 has a predetermined magnetic field. A first metal layer 140 is disposed under the first substrate 110 and is substantially aligned with the vibration chamber 170. A second metal layer 150 is disposed on the second substrate 120 and is aligned with the vibration chamber 170. The electricity storage device 160 is electrically connected to the first metal layer 140 and second metal layer 150.

In addition, the power generator 100 further comprises a first circuit 180 and a second circuit 190. The electricity storage device 160 is connected to the first metal layer 140 through the first circuit 180 and connected to the second metal layer 150 through the second circuit 190. Meanwhile, a first insulation control switch 181 is disposed on the first circuit 180, and a second insulation control switch 191 is disposed on the second circuit 190. As will be described below, the first and second control switches 181 and 191 operate to control the flow of current in first and second coil circuits (not specifically illustrated, but described below). Further, the first insulation control switch 181 and second insulation control switch 191 may be N-type transistors (NMOS).

A first coil circuit (not shown) is formed on the first metal layer 140, and a second coil circuit (not shown) is formed on the second metal layer 150. As will be described below, the first and second coil circuits function to create or generate induced electric currents due to the changing magnetic field of the magnetic film 130, when the film vibrates. The first coil circuit and second coil circuit may be formed by photolithography and etching or printing.

Additionally, the electricity storage device 160 may be any of a variety of devices, including a capacitor or battery that can store electricity. Further, the vibration chamber 170 is evacuated to create a vacuum with pressure of approximately $10^{-6}$ torr. The overall operation of the structure 100 will be described below.

Having described the structure of one embodiment of a power generator, the following description is directed to a method of forming the power generator 100.

Figure 1A:
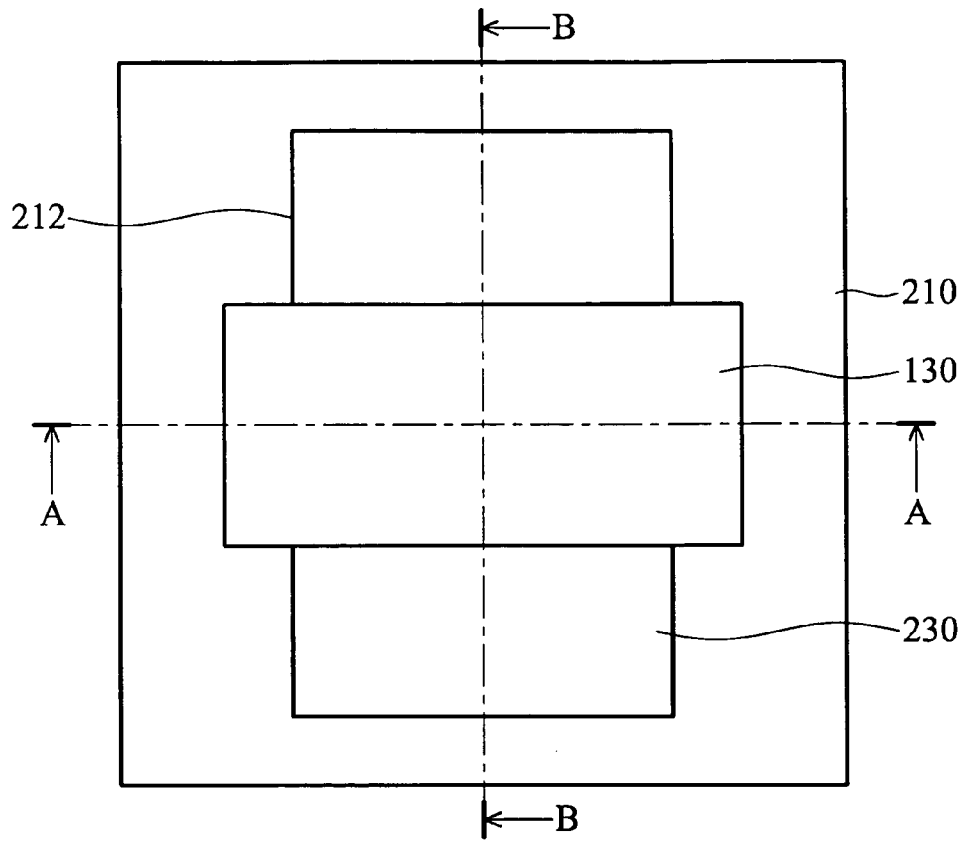
FIG. 1A is a schematic view showing the formation of the power generator of an embodiment of the invention.
Figure 1B:
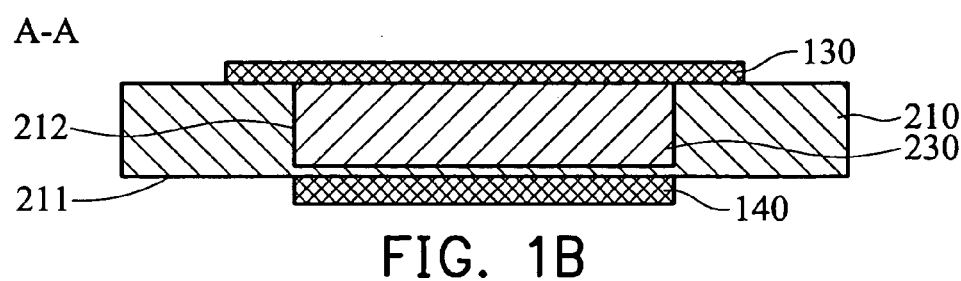
FIG. 1B is a schematic cross section taken along line A—A of FIG. 1A.
Figure 1C:
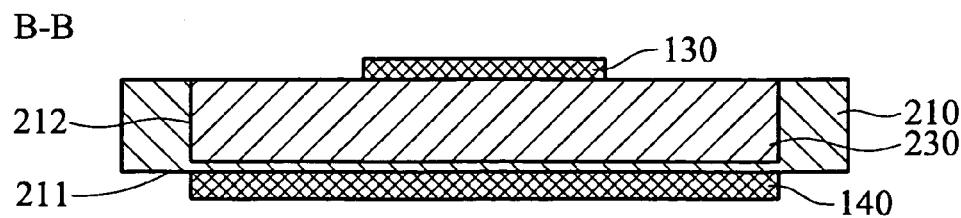
FIG. 1C is a schematic cross section taken along line B—B of FIG. 1A.
Figure 8C:
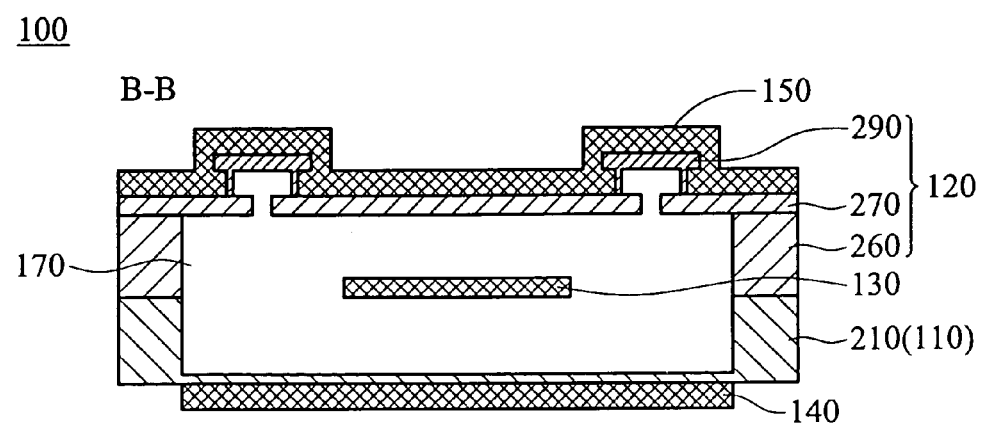
FIG. 8C is a schematic cross section taken along line B—B of FIG. 8A.

Referring to FIG. 1A, FIG. 1B and FIG. 1C, a first insulation element 210 is provided. In the following description, the insulation element 210 is identical to the first substrate 110 as shown in FIG. 8B and FIG. 8C for clarity of the description to the method of forming the power generator 100. A first metal layer 140 is formed on the lower surface 211 of the first insulation element 210. Then, a recess 212 aligned with the first metal layer 140 is formed in the first insulation element 210. A second insulation element 230 is filled in the recess 212. Then, a magnetic film 130 is formed on the recess 212 of the first insulation element 210.

Figure 2A:
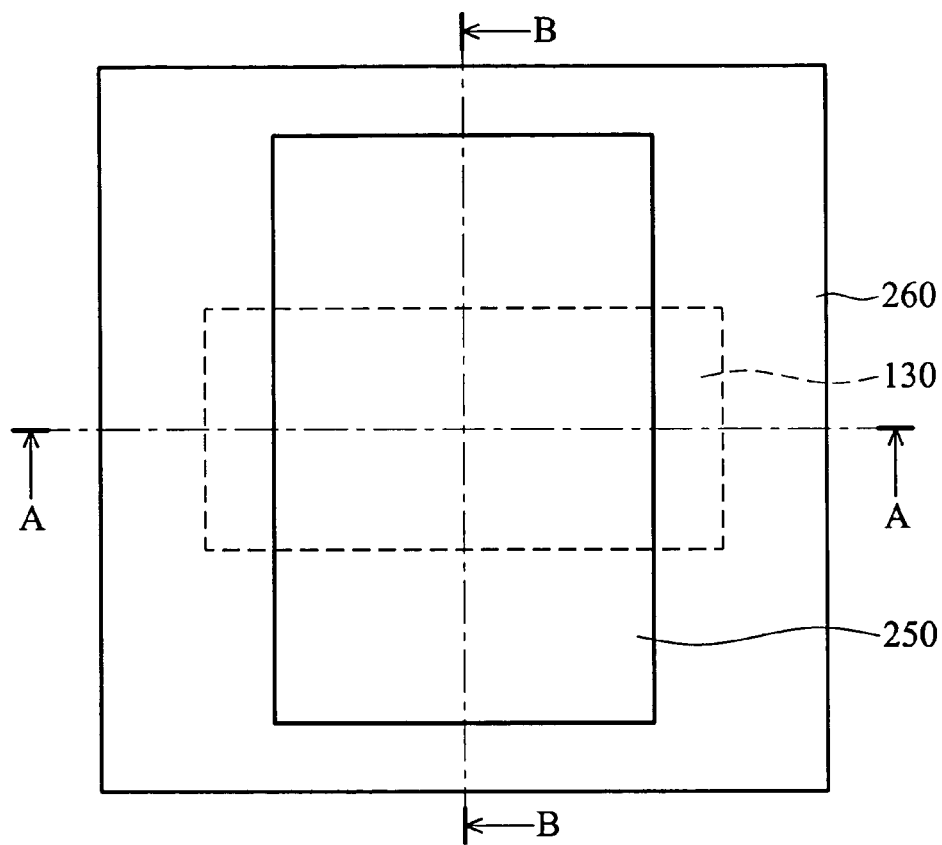
FIG. 2A is a schematic view showing the formation of the power generator of an embodiment of the invention.
Figure 2B:
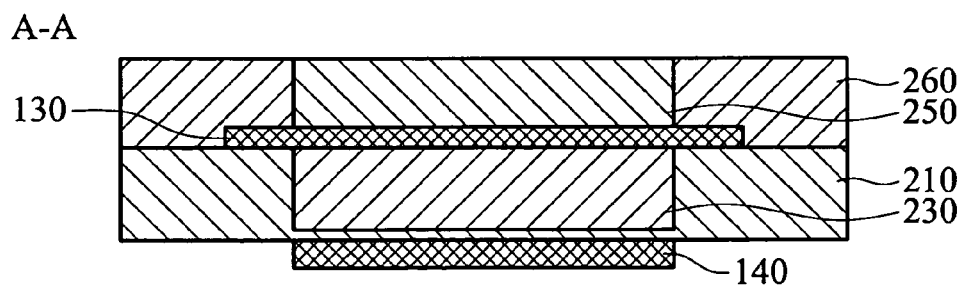
FIG. 2B is a schematic cross section taken along line A—A of FIG. 2A.
Figure 2C:
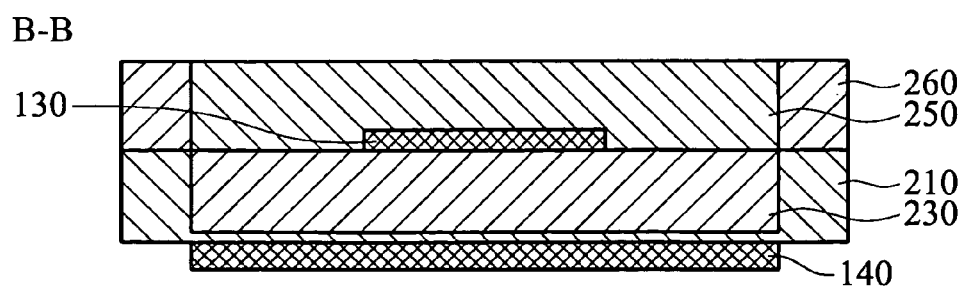
FIG. 2C is a schematic cross section taken along line B—B of FIG. 2A.

Referring to FIG. 2A, FIG. 2B and FIG. 2C, a third insulation element 250 is formed on the magnetic film 130. The third insulation element 250 is aligned with the second insulation element 230. Then, a fourth insulation element 260 is formed on the first insulation element 210 and magnetic film 130. The fourth insulation element 260 receives the third insulation element 250.

Figure 3A:
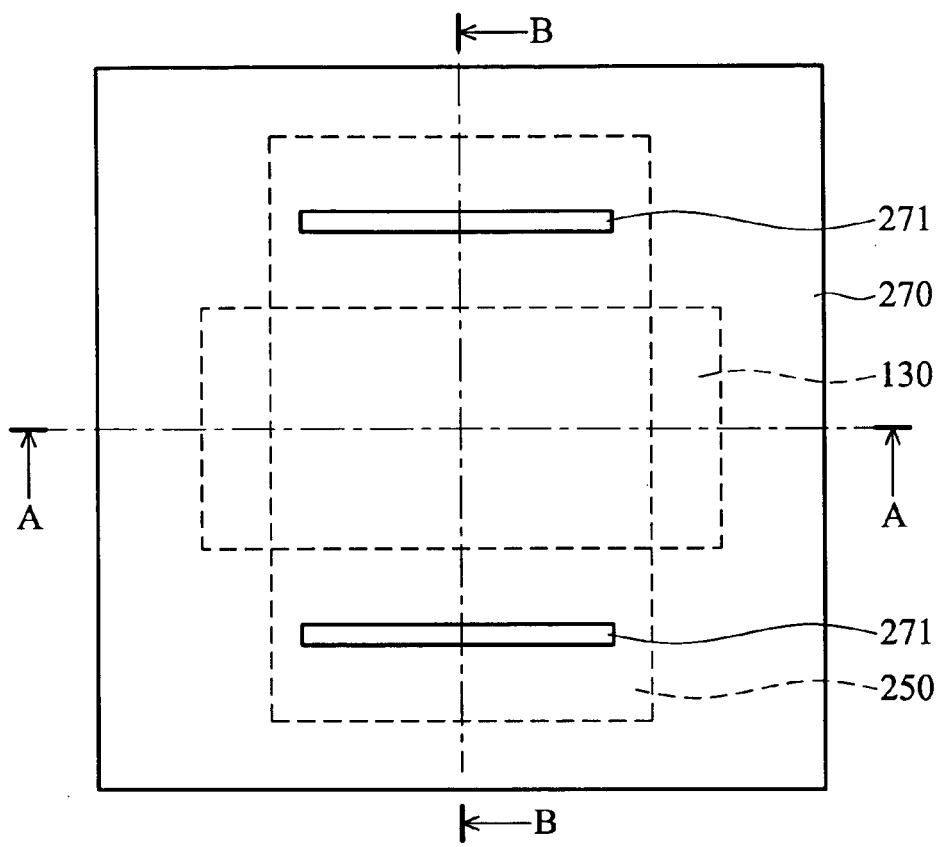
FIG. 3A is a schematic view showing the formation of the power generator of an embodiment of the invention.
Figure 3B:
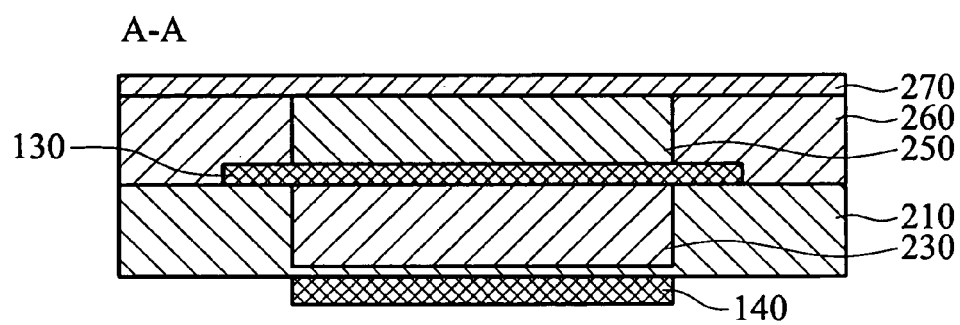
FIG. 3B is a schematic cross section taken along line A—A of FIG. 3A.
Figure 3C:
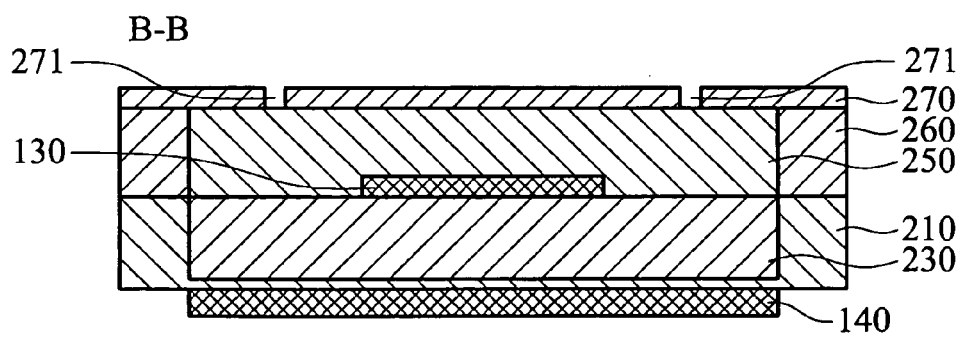
FIG. 3C is a schematic cross section taken along line B—B of FIG. 3A.

Referring to FIG. 3A, FIG. 3B and FIG. 3C, a fifth insulation element 270 is formed on the third insulation element 250 and fourth insulation element 260. Then, two first through-grooves 271 are formed on the fifth insulation element 270. The first through-grooves 271 are located on the third insulation element 250, as shown in FIG. 3A and FIG. 3C. Specifically, the first through-grooves 271 are formed on the fifth insulation element 270 by etching.

The first through-grooves 271 are formed on the fifth insulation element 270 for the subsequent forming process.

Figure 4A:
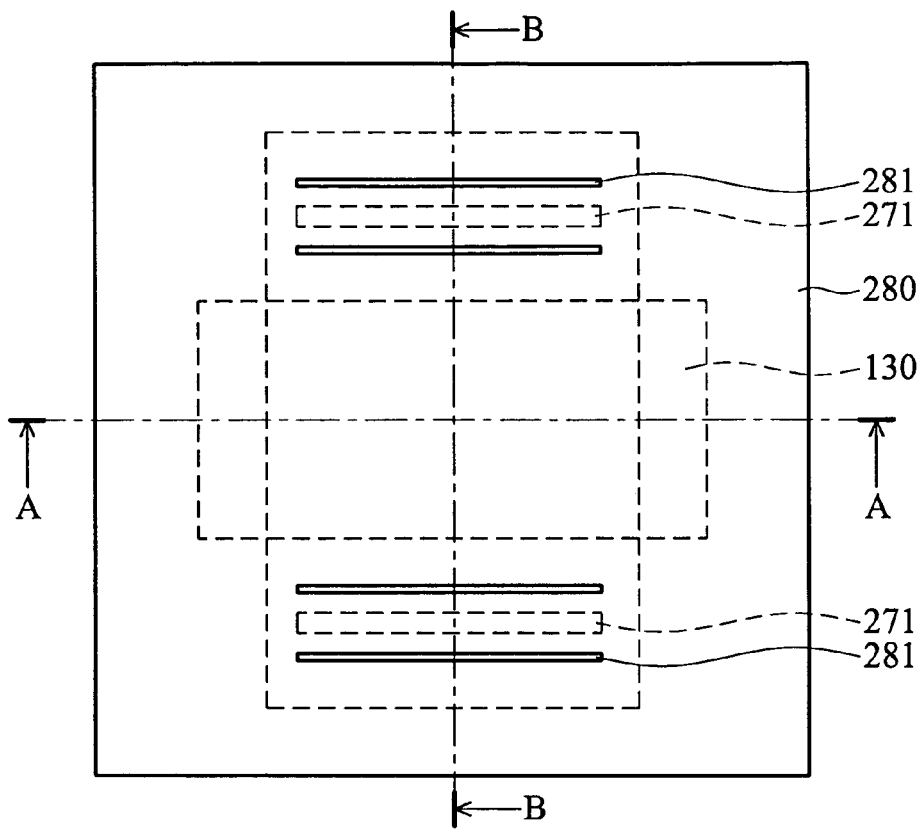
FIG. 4A is a schematic view showing the formation of the power generator of an embodiment of the invention.
Figure 4B:
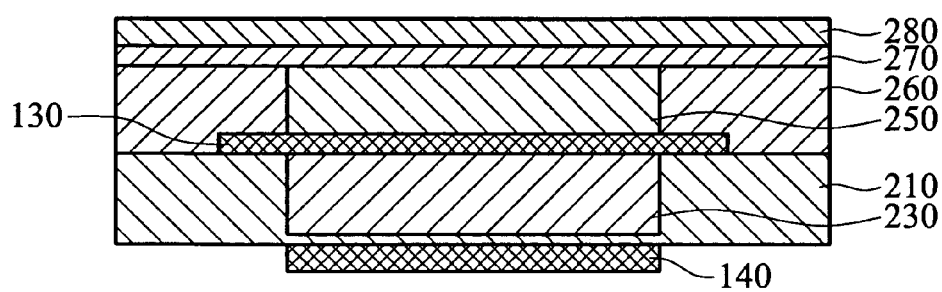
FIG. 4B is a schematic cross section taken along line A—A of FIG. 4A.
Figure 4C:
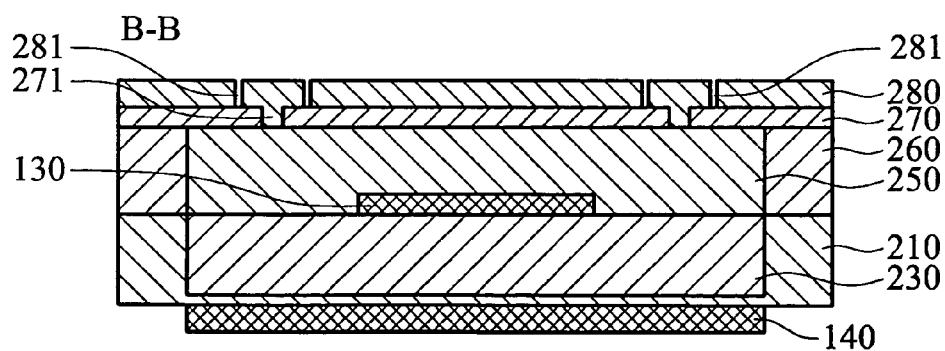
FIG. 4C is a schematic cross section taken along line B—B of FIG. 4A.

Referring to FIG. 4A, FIG. 4B and FIG. 4C, a sixth insulation element 280 is formed on the fifth insulation element 270 and in the first through-grooves 271. Then, a plurality of second through-grooves 281 are formed on the sixth insulation element 280. The second through-grooves 281 are aligned with the first through-grooves 271 of the fifth insulation element 270, as shown in FIG. 4A and FIG. 4C. Preferably, the second through-grooves 281 are formed on the sixth insulation element 280 by etching.

Figure 5A:
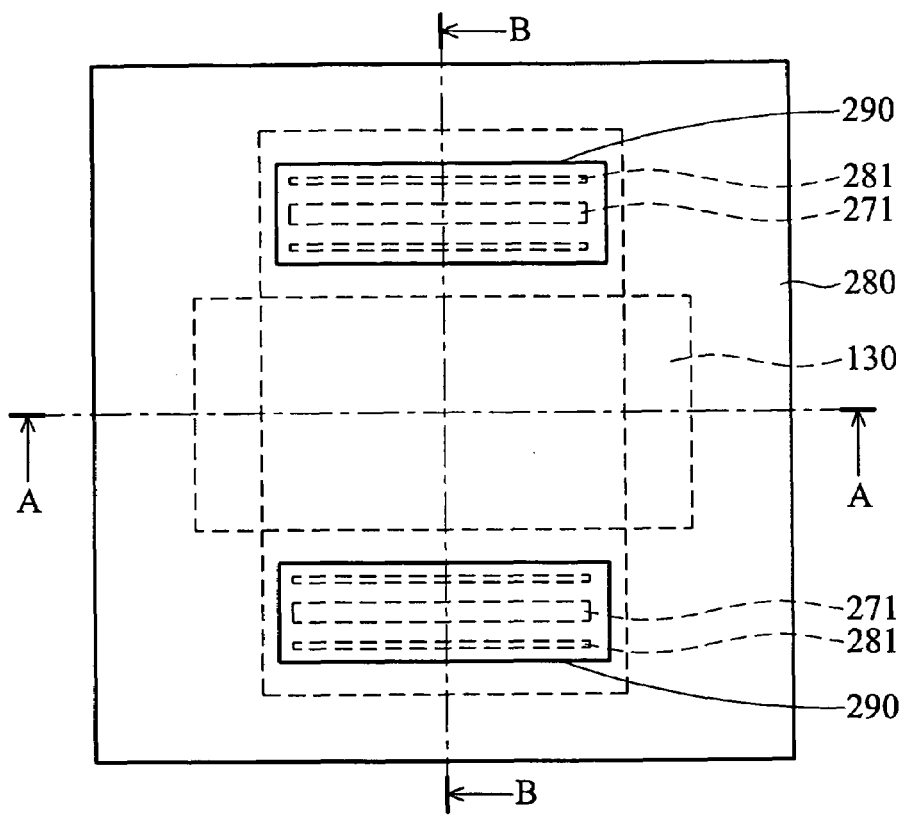
FIG. 5A is a schematic view showing the formation of the power generator of an embodiment of the invention.
Figure 5B:
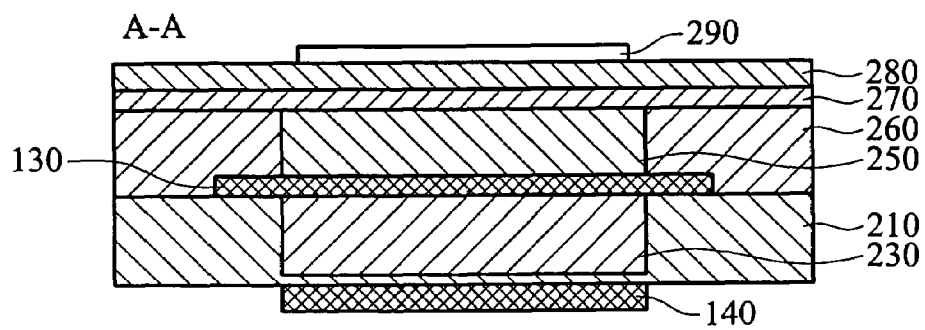
FIG. 5B is a schematic cross section taken along line A—A of FIG. 5A.
Figure 5C:
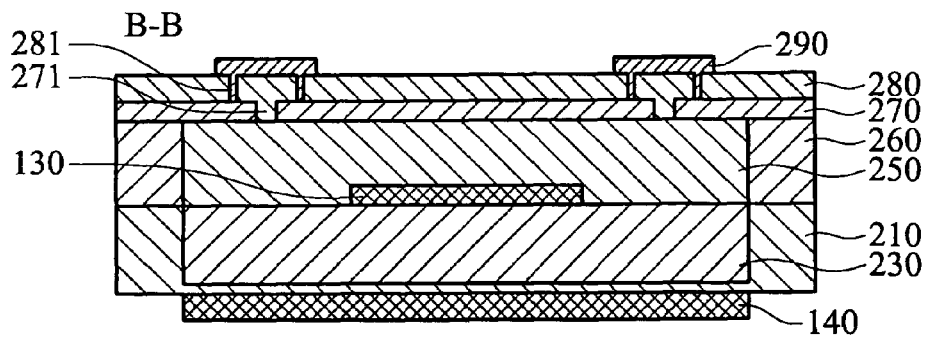
FIG. 5C is a schematic cross section taken along line B—B of FIG. 5A.

Referring to FIG. 5A, FIG. 5B and FIG. 5C, two seventh insulation elements 290 are formed on the sixth insulation element 280 and in the second through-grooves 281.

Figure 6:
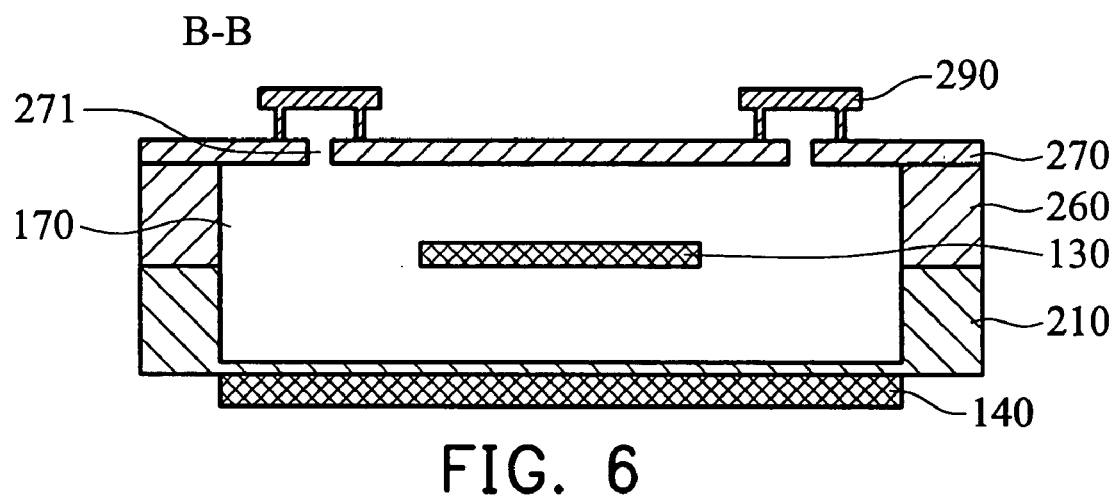
FIG. 6 is a schematic cross section showing the formation of the power generator of an embodiment of the invention.

Referring to FIG. 6, the second insulation element 230, third insulation element 250 and sixth insulation element 280 are removed by wet etching to form the vibration chamber 170. Meanwhile, the magnetic film 130 remains and divides the vibration chamber 170. Specifically, the wet etching employs HF solution to corrode and remove the second insulation element 230, third insulation element 250 and sixth insulation element 280. Moreover, the first insulation element 210, fourth insulation element 260, fifth insulation element 270 and seventh insulation elements 290 are preferably composed of a material, such as SiN, that has a solid texture or is not easily corroded by acidic solution. On the other hand, the second insulation element 230, third insulation element 250 and sixth insulation element 280 are composed of a material, such as fluorinated silicate glass (FSG) or spin on glass (SOG), which has a loose texture or is easily corroded by acidic solution. Thus, when the second insulation element 230, third insulation element 250, and sixth insulation element 280 encounter HF solution, they are corroded readily. Conversely, when the first insulation element 210, fourth insulation element 260, fifth insulation element 270, and seventh insulation elements 290 encounter HF solution, they do not corrode.

Figure 7A:
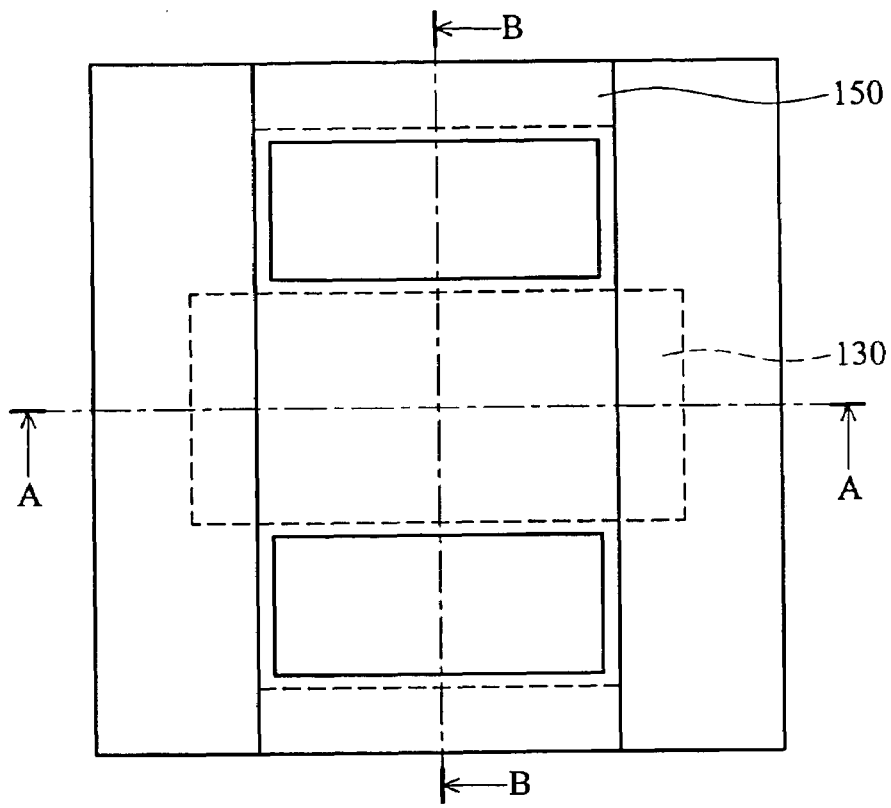
FIG. 7A is a schematic view showing the formation of the power generator of the invention.
Figure 7B:
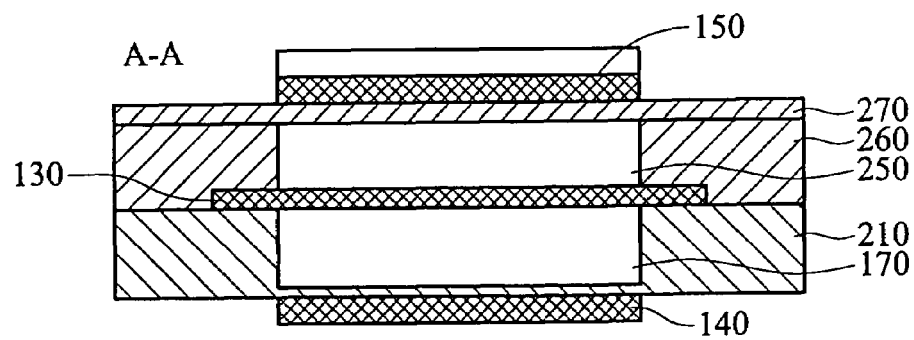
FIG. 7B is a schematic cross section taken along line A—A of FIG. 7A.
Figure 7C:
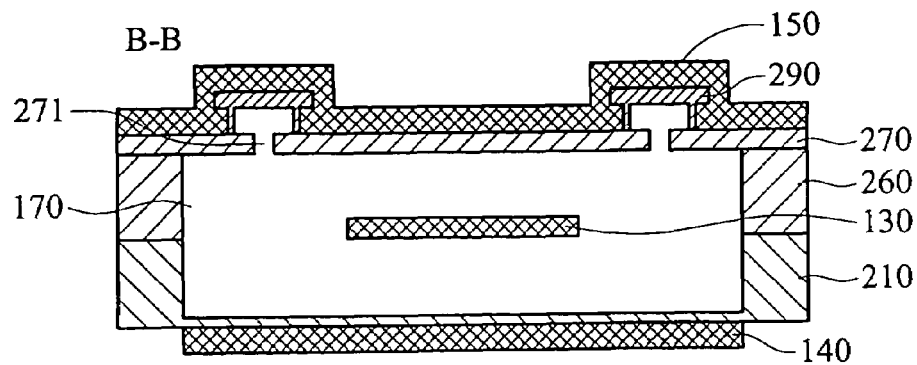
FIG. 7C is a schematic cross section taken along line B—B of FIG. 7A.

Referring to FIG. 7A, FIG. 7B and FIG. 7C, air in the vibration chamber 170 is evacuated (e.g., pumped out) until the inner air pressure thereof lowers to approximately $10^{-6}$ torr. Then, the second metal layer 150 is sputtered on the fifth insulation element 270 and seventh insulation elements 290. Furthermore, a first coil circuit (not shown) and second coil circuit (not shown) are respectively formed on the first metal layer 140 and second metal layer 150 by photolithography and etching or printing.

The first circuit 180 and second circuit 190 are connected to the electricity storage device 160 to obtain the power generator 100 as shown in FIG. 8B. In the power generator 100, the second substrate 120 is composed of the fourth insulation element 260, fifth insulation element 270 and seventh insulation elements 290 while the first insulation element 210 is the first substrate 110.

Having described the structure and method for forming a power generator, the following description explains the operation of the power generator 100.

As shown in FIG. 8A, FIG. 8B and FIG. 8C, two ends of the magnetic film 130 are fixed between the first substrate 110 and second substrate 120, and the central part of the magnetic film 130 is suspended in the vibration chamber 170. When the power generator 100 is placed on a vibration source and vibrates therewith, the central part of the magnetic film 130 vibrates in directions A and B repeatedly. Because the magnetic film 130 has a predetermined magnetic field, vibrations of the film 130 generate induced currents in the first coil circuit of the first metal layer 140 and second coil circuit of the second metal layer 150. The induced currents flow into the electricity storage device 160 via the first circuit 180 and second circuit 190 to charge the electricity storage device 160.

As shown in FIG. 8B, when the central part of the magnetic film 130 moves in the direction shown by arrow A, the magnetic film 130 induces the first coil circuit of the first metal layer 140 to generate an induced current. At this time, the first insulation control switch 181 (N-type transistors) is turned on to completely link the first circuit 180, such that the induced current in the first coil circuit flows into the electricity storage device 160. Conversely, when the central part of the magnetic film 130 moves in the direction shown by arrow B, the induced current in the first coil circuit decreases gradually until the central part of the magnetic film 130 returns to its initial position. When the central part of the magnetic film 130 continues to move toward the second metal layer 150 in the direction shown by arrow B, the magnetic film 130 also induces the second coil circuit of the second metal layer 150 to generate current. Alternatively, a reverse induced current is generated in the first coil circuit of the first metal layer 140. Namely, the reverse induced current flows from the electricity storage device 160 into the first coil circuit.

Thus, in order to prevent the current from flowing into the first coil circuit, the first insulation control switch 181 (N-type transistors) is disposed to prevent the current from flowing into the first coil circuit from the electricity storage device 160. Accordingly, the induced current in the first coil circuit can flow into the electricity storage device 160 via the first insulation control switch 181, and the first insulation control switch 181 can prevent the current from flowing into the first coil circuit from the electricity storage device 160. Similarly, the second insulation control switch 191 (N-type transistors) disposed in the second circuit 190 has a similar function (as the first insulation control switch 181) with respect to the second coil circuit.

In conclusion, the power generator 100 can be placed on any vibration source, or embedded in devices that are subject to vibration, to convert vibration energy into electric energy. Thus, the power generator 100 of the invention obtains electric power readily with environmental degradation. In addition, the power generator 100 of the invention is not limited to a chip-size power generator. Namely, the power generator 100 of the invention may be a large-size power generator such as a house-size or car-size power generator according to various applications.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power generator, comprising:
   a first substrate;
   a second substrate disposed on the first substrate, wherein a vibration chamber is formed between the first substrate and second substrate;
   a magnetic film disposed between the first substrate and second substrate and located in the vibration chamber, wherein the magnetic film has a predetermined magnetic field;
   a first metal layer disposed under the first substrate and substantially aligned with the vibration chamber;
   a second metal layer disposed on the second substrate and substantially aligned with the vibration chamber; and
   an electricity storage device electrically coupled to the first metal layer and second metal layer.

2. The power generator as claimed in claim 1, further comprising a first circuit and a second circuit, the electricity storage device connected to the first metal layer through the first circuit and connected to the second metal layer through the second circuit.

3. The power generator as claimed in claim 2, further comprising a first insulation control switch and a second insulation control switch, the first insulation control switch disposed on the first circuit, and the second insulation control switch disposed on the second circuit.

4. The power generator as claimed in claim 3, wherein the first insulation control switch and second insulation control switch are N-type transistors (NMOS).

5. The power generator as claimed in claim 1, wherein the first substrate and second substrate are composed of insulating materials.

6. The power generator as claimed in claim 1, wherein the first metal layer further comprises a first coil circuit, and the second metal layer further comprises a second coil circuit.

7. The power generator as claimed in claim 6, wherein the first coil circuit and second coil circuit are respectively formed on the first metal layer and second metal layer by photolithography and etching.

8. The power generator as claimed in claim 6, wherein the first coil circuit and second coil circuit are respectively formed on the first metal layer and second metal layer by printing.

9. The power generator as claimed in claim 1, wherein the vibration chamber is a vacuum.

10. The power generator as claimed in claim 9, wherein the vacuum provides pressure of approximately $10^{-6}$ torr.

11. The power generator as claimed in claim 1, wherein the electricity storage device is a capacitor.

12. The power generator as claimed in claim 1, wherein the electricity storage device is a battery.

13. The power generator as claimed in claim 1, wherein the first and second substrates are SiN.

14. A semiconductor device, comprising:
   a semiconductor chip;
   a power generator embedded in the semiconductor chip for obtaining electric power by converting vibration energy into electric energy, the power generator comprising:
   a first substrate;
   a second substrate disposed on the first substrate, wherein a vibration chamber is formed between the first substrate and second substrate;
   a magnetic film disposed between the first substrate and second substrate and located in the vibration chamber, wherein the magnetic film has a predetermined magnetic field;
   a first metal layer disposed under the first substrate;
   a second metal layer disposed on the second substrate; and
   an electricity storage device electrically coupled to the first metal layer and second metal layer.

* * * * *